J. F. HERMAN.
OVERSHOE FOR HORSES.
APPLICATION FILED APR. 11, 1911.
1,039,736.
Patented Oct. 1, 1912.
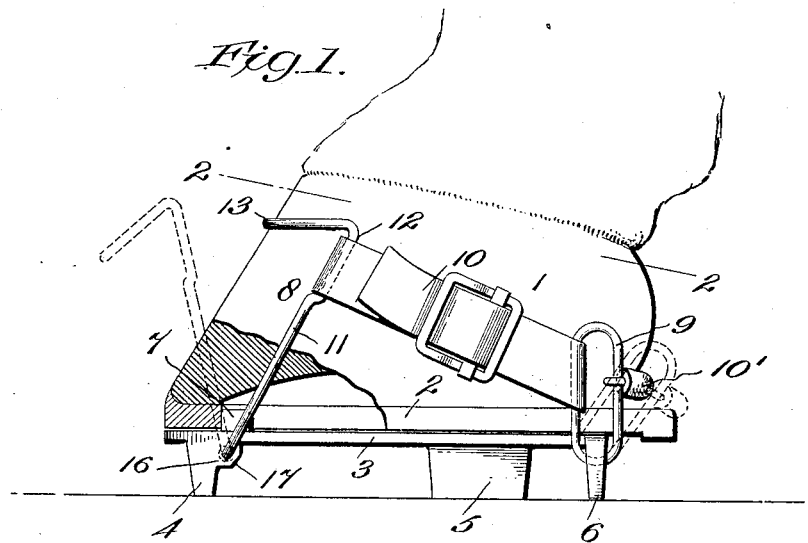
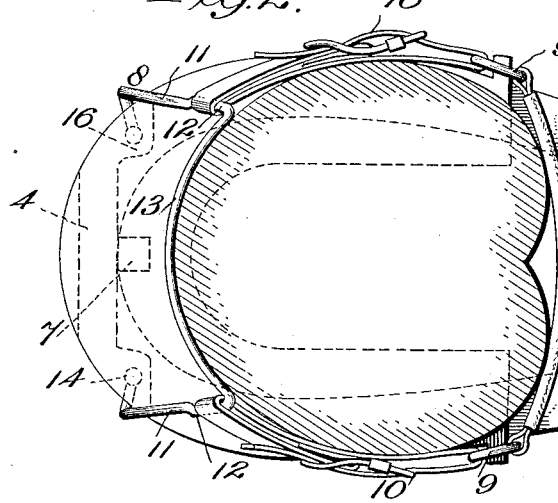
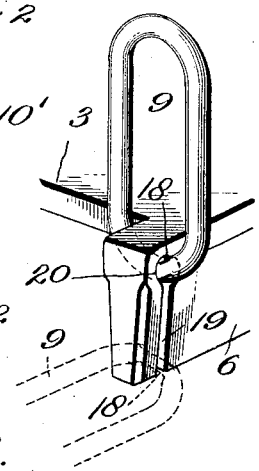
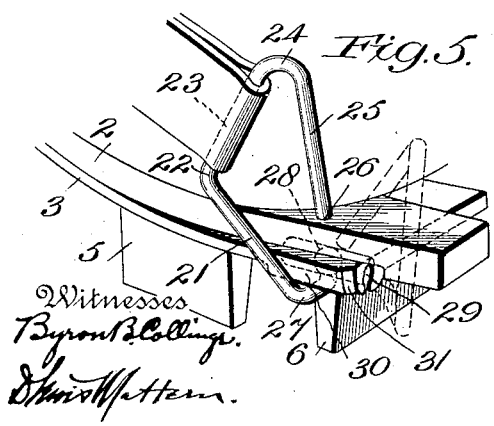
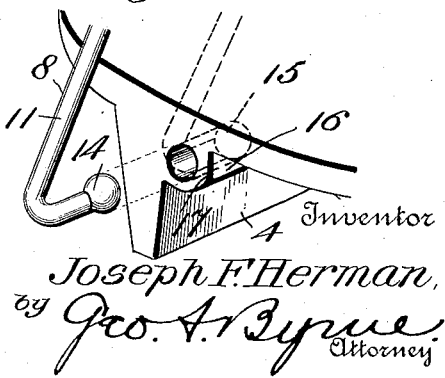
Inventor
Joseph F. Herman,
by Geo. A. Byrne
Attorney

UNITED STATES PATENT OFFICE.

JOSEPH F. HERMAN, OF WASHINGTON, DISTRICT OF COLUMBIA.

OVERSHOE FOR HORSES.

1,039,736.  Specification of Letters Patent.  Patented Oct. 1, 1912.

Application filed April 11, 1911. Serial No. 620,434.

*To all whom it may concern:*

Be it known that I, JOSEPH F. HERMAN, a citizen of the United States, residing at Washington, in the District of Columbia, have invented certain new and useful Improvements in Overshoes for Horses, of which the following is a specification.

This invention relates to certain new and useful improvements in overshoes for horses and has for its object to provide a device of this character that will be capable of adjustment to the hoof of any horse; one that is simple in construction; cheap to manufacture, and one that can be positively locked to a horse's hoof and thereby prevented from working loose and becoming lost, as is now the case.

To these ends the invention consists in the novel details of construction and combination of parts more fully hereinafter described and particularly pointed out in the claims.

Referring to the drawings forming a part of this specification in which like numerals designate like parts in all the views:—Figure 1 is a side elevation of a horse's hoof provided with a horseshoe and showing my invention applied thereto, parts shown broken away for the sake of clearness. Fig. 2 is a cross sectional view taken on the line 2—2 of Fig. 1. Fig. 3 is an enlarged detail perspective view of a portion of the plate showing the method of attaching the toe-stay thereto. Fig. 4 is an enlarged detail perspective view of a portion of the plate showing the method of attaching the heel-stay, and Fig. 5 is a detail perspective view showing a modified form of heel-stay.

1 designates a horse's hoof provided with a horseshoe 2 to which is held the plate 3 of my improved overshoe, which plate is provided with anti-slipping devices comprising the toe calk 4, side calks 5 and heel calks 6. To prevent any longitudinal movement of the overshoe when held in place I provide a stud 7 cast on the toe portion of the plate 3 which abuts against the inner surface of the horseshoe, as is clearly shown in Fig. 1.

The means for locking the overshoe to the hoof comprise the toe-stay 8, the heel-stays 9 the side straps 10 and the back-stay 10'. The toe-stay 8 mounted in the toe portion of the plate is formed of a single piece of wire having side portions 11 provided with the bent strap retaining portions 12 and the top portion 13. The ends of the toe-stay are provided with the enlarged or ball portions 14 held in the sockets 15 located within the enlargements 16 on the under side of the plate. In attaching the toe-stay to the plate the ball portions are sprung into the sockets and the ends 17 are crushed in by being struck with a hammer, thereby securely locking the stay to the plate and forming a ball and socket joint therein.

The heel-stays 9, preferably chain links, are held to the heel portion of the plate 3 by being connected to the outward extending portions of the heel calks. In attaching these links they are first brought to the position as shown by dotted lines in Fig. 4, the cut away portions 18 on the stays entering the slots 19 in the heel calks. They are then brought up and seated in the enlargements 20 in the ends of the slots, and by being turned at right angles as shown in full lines, they are locked therein. To further secure these links in position, the slots 19 are crushed in by striking the ends of the calks with a hammer. The back-stay 10' is secured to the links 9 and is adapted to fit around the back of the heel of a horse's hoof.

In fitting my overshoe to a horse's hoof it is only necessary to place it under the horseshoe in the usual manner; the stud 7 abutting against the inner surface of the horseshoe; and the toe and heel-stays being swung out to the positions as shown by dotted lines in Fig. 1. When placed in its proper position the toe and heel-stays are then swung in and the side straps are connected thereto and tightened, which will cause the back-stay to bind around the back of the heel of the horse's hoof and the overshoe to be securely held in place. By the reason of the adjustment and flexibility of the toe and heel-stays connected by the straps, it will be seen that the overshoe will snugly fit the hoof, and in combination with the back-stay and locking stud, it will also be seen that the overshoe will be positively held to a horse's hoof in a rigid manner.

In the modification shown in Fig. 5 the heel-stays are preferably made of the shape shown and comprise the forward sloping portion 21 bent as at 22 to form the rearwardly extending strap holding portion 23 which is again bent as at 24 to form the downwardly extending portion 25. This downwardly extending portion is also bent inwardly so that its end 26 will rest on the upper part of the heel of the horseshoe just behind the hoof to prevent any movement of the back part of the overshoe when locked in place. These heel-stays 9 may be held to the overshoe in any suitable manner, but I have shown one way whereby I can obtain a certain degree of longitudinal adjustment so that my improved overshoe may be readily fitted to the hoof of any horse. The ends of the sloping portions 21 are bent as at 27 around the outer and under sides of the heel portions of the plate 3 and are provided with enlarged heads 28 which are adapted to travel in the elongated sockets 29 formed in the enlargements 30 on the under side of the heel portions of the plate, 3 as is clearly shown. To securely hold the heel-stays to the plate and prevent the heads 22 from becoming disengaged from the sockets 29, the ends are upset as indicated at 31.

It is not to be understood that I limit myself to the details of construction and arrangements of parts herein described and illustrated, as it is manifest that variations and modifications may be made in the features of construction and arrangement in the adaptation of the device to various conditions of use without departing from the spirit and scope of my invention and improvements. I therefore reserve the right to all such variations and modifications as properly fall within the scope of my invention and the terms of the following claims.

What I claim is:—

1. The combination with a shoe for a horse's hoof of an overshoe therefor, and means for securing said overshoe to the horseshoe, said means comprising a toe stay consisting of a piece of wire having its opposite ends connected with said overshoe and formed with a yoke portion adapted to conform with and overlie the hoof; heel stays consisting of links loosely connected to said overshoe; and means connecting said toe and heel stays for holding said overshoe over the hoof, substantially as described.

2. An overshoe for horses comprising a plate provided with sockets on one face thereof and anti-slipping means; a stay provided with enlarged end portions mounted in said sockets, the metal surrounding said sockets adapted to be crushed in for holding the enlarged ends of the stay therein; and means connected to said stay for holding said overshoe to the hoof, substantially as described.

3. An overshoe for horses' hoofs comprising a plate provided with sockets and anti-slipping means; links forming heel stays mounted in said sockets, the metal surrounding said sockets adapted to be crushed in for retaining said links; and means connected to said links for holding said overshoe to the hoof, substantially as described.

4. The combination with a horse-shoe of an overshoe therefor provided with toe and heel calks, and means for securing said overshoe to the horseshoe comprising a member secured to the toe calk and disposed transversely of the overshoe, a member secured to each of the heel calks, and members connecting said calk engaging members together, substantially as described.

In testimony whereof I affix my signature in presence of two witnesses.

JOSEPH F. HERMAN.

Witnesses:
   Geo. A. Byrne,
   Geo. B. Pitts.

---

Copies of this patent may be obtained for five cents each, by addressing the "Commissioner of Patents, Washington, D. C."